(12) United States Patent
Park et al.

(10) Patent No.: US 12,444,814 B2
(45) Date of Patent: Oct. 14, 2025

(54) APPARATUS FOR WELDING ELECTRODE TABS, METHOD FOR WELDING ELECTRODE TABS, AND SECONDARY BATTERY

(71) Applicant: LG Energy Solution, Ltd., Seoul (KR)

(72) Inventors: Ah Ram Park, Daejeon (KR); Yong Tae Lee, Daejeon (KR); Seung Byung Lee, Daejeon (KR); Seok Je Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/713,926

(22) PCT Filed: Nov. 29, 2022

(86) PCT No.: PCT/KR2022/019104
§ 371 (c)(1),
(2) Date: May 28, 2024

(87) PCT Pub. No.: WO2023/096469
PCT Pub. Date: Jun. 1, 2023

(65) Prior Publication Data
US 2025/0023202 A1    Jan. 16, 2025

(30) Foreign Application Priority Data

Nov. 29, 2021 (KR) .................. 10-2021-0167738
Nov. 29, 2022 (KR) .................. 10-2022-0163018

(51) Int. Cl.
*B23K 20/00* (2006.01)
*B23K 20/10* (2006.01)
*H01M 50/536* (2021.01)

(52) U.S. Cl.
CPC ........... *H01M 50/536* (2021.01); *B23K 20/10* (2013.01)

(58) Field of Classification Search
CPC .... H01M 50/536; H01M 10/04; H01M 50/54; H01M 10/0404; H01M 50/105;
(Continued)

(56) References Cited

U.S. PATENT DOCUMENTS

2010/0028770 A1  2/2010  Ryu et al.
2010/0143787 A1  6/2010  Jung et al.
(Continued)

FOREIGN PATENT DOCUMENTS

CN   102522519 A   6/2012
CN   112713343 A   4/2021
(Continued)

OTHER PUBLICATIONS

International Search Report for Application No. PCT/KR2022/019107 mailed Mar. 15, 2023, pp. 1-3.
(Continued)

*Primary Examiner* — Kiley S Stoner
(74) *Attorney, Agent, or Firm* — Lerner David LLP

(57) ABSTRACT

An apparatus and method for welding electrode tabs protruding from an electrode assembly to each other which may include a guide part configured to gather the electrode tabs on a predetermined gathering area, a welding part configured to weld the electrode tabs gathered by the guide part, and a bending part configured to bend the electrode assembly. The bending part ensures that a length from the electrode assembly to the gathering area increases in at least a portion of the electrode tabs before being welded by the welding part. Accordingly, some aspects of the present invention may prevent the electrode tabs from disconnecting. Moreover, the present invention also relates to a secondary battery and may relate to a secondary battery manufactured by the above-described welding apparatus or method.

10 Claims, 16 Drawing Sheets

(58) Field of Classification Search
CPC . H01M 50/528; H01M 10/0413; Y02E 60/10; B23K 20/103; B23K 2101/38; B23K 11/06; B23K 11/002; B23K 2101/36; B23K 37/0435; B23K 20/10–106; Y02P 70/50
USPC .............................................. 228/110.1, 1.1
See application file for complete search history.

(56) References Cited

U.S. PATENT DOCUMENTS

| | | | |
|---|---|---|---|
| 2014/0352138 A1 | 12/2014 | Yasooka et al. | |
| 2015/0288026 A1 | 10/2015 | Yamamoto | |
| 2017/0110707 A1 | 4/2017 | Yamamoto | |
| 2019/0148705 A1* | 5/2019 | Park | H01M 50/533 |
| | | | 429/452 |
| 2019/0148705 A1 | 5/2019 | Park et al. | |
| 2019/0379032 A1* | 12/2019 | Park | H01M 50/595 |
| 2020/0212408 A1* | 7/2020 | Zhang | H01M 50/46 |
| 2020/0313145 A1 | 10/2020 | Jiang | |
| 2021/0280841 A1 | 9/2021 | Aizawa et al. | |
| 2022/0416374 A1 | 12/2022 | Li et al. | |
| 2023/0299433 A1* | 9/2023 | Cho | H01M 50/178 |
| | | | 429/211 |
| 2023/0339038 A1* | 10/2023 | Son | H01M 50/536 |
| 2023/0339038 A1 | 10/2023 | Son et al. | |
| 2024/0128603 A1* | 4/2024 | Kim | H01M 50/533 |

FOREIGN PATENT DOCUMENTS

| | | | | |
|---|---|---|---|---|
| EP | 4108375 A1 | 12/2022 | | |
| EP | 4235944 A1 | 8/2023 | | |
| EP | 4393630 A1 * | 7/2024 | | B23K 20/10 |
| JP | 2007234466 A | 9/2007 | | |
| JP | 2010509711 A | 3/2010 | | |
| JP | 2012124171 A * | 6/2012 | | H01M 50/533 |
| JP | 2013165037 A | 8/2013 | | |
| JP | 2013178997 A | 9/2013 | | |
| JP | WO2013160932 A1 | 12/2015 | | |
| JP | 2017004846 A | 1/2017 | | |
| JP | 2017168462 A | 9/2017 | | |
| JP | 2019179673 A | 10/2019 | | |
| JP | 2019207794 A * | 12/2019 | | |
| JP | 2019207861 A * | 12/2019 | | |
| JP | 2021089857 A | 6/2021 | | |
| JP | 2021140898 A | 9/2021 | | |
| KR | 20080021271 A * | 3/2008 | | H01M 10/0459 |
| KR | 100848788 B1 | 7/2008 | | |
| KR | 2012-0010928 A | 2/2012 | | |
| KR | 20160007109 A * | 1/2016 | | H01M 10/0436 |
| KR | 20170046910 A | 5/2017 | | |
| KR | 2017-0095067 A | 8/2017 | | |
| KR | 20180072065 A | 6/2018 | | |
| KR | 20180081288 A * | 7/2018 | | H01M 50/178 |
| KR | 20190054617 A | 5/2019 | | |
| KR | 20200105272 A | 9/2020 | | |
| KR | 20210021871 A | 3/2021 | | |
| KR | 102234993 B1 | 4/2021 | | |
| KR | 102256603 B1 * | 6/2021 | | H01M 50/178 |
| KR | 102263601 B1 | 6/2021 | | |
| KR | 2021-0092094 A | 7/2021 | | |
| KR | 2021-0138400 A | 11/2021 | | |
| KR | 20230080364 A * | 6/2023 | | B23K 20/26 |
| WO | WO-2019194416 A1 * | 10/2019 | | H01M 50/50 |
| WO | WO-2023096469 A1 * | 6/2023 | | H01M 10/04 |
| WO | WO-2023096470 A1 * | 6/2023 | | B23K 20/10 |
| WO | WO-2024019445 A1 * | 1/2024 | | B21D 53/00 |

OTHER PUBLICATIONS

International Search Report for Application No. PCT/KR2022/019104 mailed Mar. 20, 2023, pp. 1-3.

Extended European Search Report including Written Opinion for Application No. 22899152.7, dated Jan. 29, 2025, 8 pgs.

* cited by examiner

APPARATUS FOR WELDING ELECTRODE TABS, METHOD FOR WELDING ELECTRODE TABS, AND SECONDARY BATTERY

CROSS-REFERENCE TO RELATED APPLICATIONS

The present application is a national phase entry under 35 U. S. C. § 371 of International Application No. PCT/KR2022/019104 filed Nov. 29, 2022, which claims priority to Korean Patent Application Nos. 10-2021-0167738, filed on Nov. 29, 2021, and 10-2022-0163018, filed on Nov. 29, 2022, which are hereby incorporated by reference in their entirety.

TECHNICAL FIELD

The present invention relates to an apparatus for welding electrode tabs, a method for welding the electrode tabs, and a secondary battery.

BACKGROUND ART

Unlike primary batteries, which are not chargeable, secondary batteries are chargeable and dischargeable, and are widely used in electronic devices such as mobile phones, notebook computers, and camcorders. Secondary batteries are also commonly used in larger devices, such as electric vehicles. Particularly, since lithium secondary batteries have larger capacities than nickel-cadmium or nickel-hydrogen batteries, and have higher energy densities, their use has rapidly increased.

Secondary batteries may be classified into cylindrical or prismatic batteries, in which an electrode assembly is built in a cylindrical or prismatic metal can, respectively, and pouch-type batteries, in which an electrode assembly is built in a pouch-type case provided as an aluminum lamination sheet.

FIG. 1 illustrates an example of a pouch-type secondary battery. A pouch-type secondary battery 1 includes an electrode assembly 10, in which electrodes and separators are alternately stacked, and a pouch 20 (exterior material), into which the electrode assembly is accommodated. Electrode tabs 15 may be connected to the electrodes of the electrode assembly 10. The electrode tabs 15 may be welded to each other on a predetermined area and then connected to an electrode lead 17. The pouch 20 includes a cup part 21 having a recessed shape to accommodate the electrode assembly 10. Pouch 20 may be configured to include one or two cup parts. FIG. 1 illustrates an example in which the pouch 20 includes a left cup part and a right cup part. A peripheral portion 23 (terrace) is formed around a circumference of the cup part 21 by sealing.

However, when pulling force is applied to the electrode tab 15 due to deformation of the peripheral portion 23 of the pouch 20, the electrode tab 15 may gradually tighten and then disconnect. Alternatively, even when the pulling force is applied to the electrode tab 15 due to expansion of the pouch 20, the electrode tab 15 may gradually tighten and then disconnect. Such a disconnection may cause a fire. Pursuant to recent demands for high capacity and high performance, a length of the peripheral portion 23 in pouch-type secondary batteries is reduced to increase their energy density. Accordingly, a 'length of the electrode tab 15 from the electrode assembly 10 to a welding point of each of the electrode tabs 15' may be reduced, resulting in an increased risk of disconnection.

Technical Problem

An object of the present invention is to provide an apparatus and method for welding an electrode tab, in which a 'length of an electrode tab from an electrode assembly to a welding point of each of electrode tabs' increases to prevent the electrode tabs from disconnecting, even in pouch-type secondary batteries having high capacity and high performance. Additionally, an object of the present invention is to provide for a secondary battery.

Technical Solution

In one embodiment of the present invention, an apparatus for welding an electrode tab relates to an apparatus for welding electrode tabs protruding from an electrode assembly to each other, and may include a guide part configured to gather the electrode tabs on a predetermined gathering area, a welding part configured to weld the electrode tabs gathered by the guide part, and a bending part configured to bend the electrode assembly so that a length from the electrode assembly to the gathering area increases in at least a portion of the electrode tabs before being welded by the welding part.

In another embodiment, the guide part may be configured so that the electrode tabs are gathered on the gathering area disposed below a reference plane passing through a center in a vertical direction of the electrode assembly as a plane parallel to the ground when electrodes and separators of the electrode assembly are stacked in the vertical direction perpendicular to the ground, and the bending part may be configured to bend an edge of the electrode assembly, to which the electrode tabs are connected, upward.

In further another embodiment, the bending part may include a support block configured to support one of either the bottom and top surfaces of the electrode assembly and a pressing block configured to press the other of the bottom and top surfaces of the electrode assembly toward the supported surface, when electrodes and separators of the electrode assembly are stacked in a vertical direction perpendicular to the ground.

In further another embodiment, a point at which the support block may support one of either the bottom and top surfaces of the electrode assembly is disposed closer to an outside of the electrode assembly than a point at which the pressing block presses the other of the bottom and top surfaces of the electrode assembly.

In further another embodiment, the support block may be configured to support an edge of the electrode assembly, to which the electrode tabs are connected, from below the electrode assembly, and the pressing block may be configured to press the edge, which is supported by the support block, downward from above the electrode assembly so as to perform bending.

In further another embodiment, the support block may include an inclined surface gradually increasing in height toward an outside of the electrode assembly as a surface disposed below the edge.

In further another embodiment, the apparatus may further include a seating part on which the electrode assembly is seated, wherein the bending part may include a pressing block disposed inside the seating part to protrude to a top surface of the seating part, on which a bottom surface of the electrode assembly is seated, so as to press an edge of the electrode assembly, to which the electrode tabs are connected, from below, when electrodes and separators of the electrode assembly are stacked in a vertical direction perpendicular to the ground.

In further another embodiment, the bending part may further include a support block configured to partially support a top surface of the electrode assembly while being pressed by the pressing block.

In further another embodiment, the bending part may include a support block configured to support an edge of the electrode assembly, to which the electrode tabs are connected, from below, when electrodes and separators of the electrode assembly are stacked in a vertical direction perpendicular to the ground.

In further another embodiment, an apparatus for welding an electrode tab relates to an apparatus for welding electrode tabs protruding from an electrode assembly to each other, and may include a guide part configured to gather the electrode tabs on a predetermined gathering area, a welding part configured to weld the electrode tabs gathered by the guide part, and a moving part configured to relatively move the electrode assembly, with respect to the guide part, in a direction corresponding to a stacking direction of electrodes and separators of the electrode assembly so that a length from the electrode assembly to the gathering area increases in at least a portion of the electrode tabs before being welded by the welding part.

In further another embodiment, a method for welding an electrode tab relates to a method for welding electrode tabs protruding from an electrode assembly to each other and may include: (a) bending an edge of the electrode assembly, to which the electrode tabs are connected; and (b) welding the electrode tabs in a bent state.

In further another embodiment, the method may further include gathering the electrode tabs before step (a) or between step (a) and step (b).

In further another embodiment, the method may further include, after step (b), a removing force applied to the electrode assembly to bend the electrode assembly in step (a) so as to recover the electrode assembly.

In further another embodiment, step (a) may include, in a state of supporting one of either the bottom and top surfaces of the edge, pressing the other of the bottom and top surfaces of the edge toward the supported surface, when electrodes and separators of the electrode assembly are stacked in a vertical direction perpendicular to the ground.

In further another embodiment, a point at which one of either the bottom and top surfaces of the edge is supported may be disposed closer to an outside of the electrode assembly than a point at which the other of the bottom and top surfaces of the edge is pressed.

In further another embodiment, a secondary battery may include an electrode assembly, electrode tabs protruding from the electrode assembly, an exterior material configured to accommodate the electrode assembly and the electrode tabs, and an electrode lead which is electrically connected to the electrode tabs and of which a portion is exposed outside the exterior material, wherein the electrode tabs may be coupled to each other on a predetermined bonding area, a length from the electrode assembly to the bonding area in at least a portion of the electrode tabs is longer than a predetermined reference length, and the reference length is a minimum length from the electrode assembly to the bonding area in the individual electrode tabs.

In further another embodiment, an incremental length from the electrode assembly to the bonding area in at least a portion of the electrode tabs may increase toward an electrode tab disposed farther from the bonding area along a stacking direction of electrodes and separators of the electrode assembly, and the incremental length may be a value obtained by subtracting the reference length from the length from the electrode assembly to the bonding area.

In further another embodiment, the bonding area may be disposed corresponding to the lowermost electrode tab of the electrode assembly when the stacking direction corresponds to a vertical direction, and the incremental length of each of the electrode tabs may increase as the electrode tabs are disposed vertically upward.

In further another embodiment, the electrode tabs disposed above a reference plane passing through the bonding area and perpendicular to a vertical direction, and the electrode tabs disposed below the reference plane, may have asymmetrical lengths with respect to the reference plane.

Advantageous Effects

In a battery manufactured according to the present invention, an electrode assembly is bent to increase the length from the electrode assembly to the gathering area (the welding area) in at least a portion of the electrode tabs. As a result, even though the pulling force is applied to the electrode tabs due to the deformation of the peripheral portion (terrace) of the pouch, or even though the pulling force is applied to the electrode tabs due to the expansion of the battery, the electrode tabs may not disconnect.

DETAILED DESCRIPTION

Figure 1:
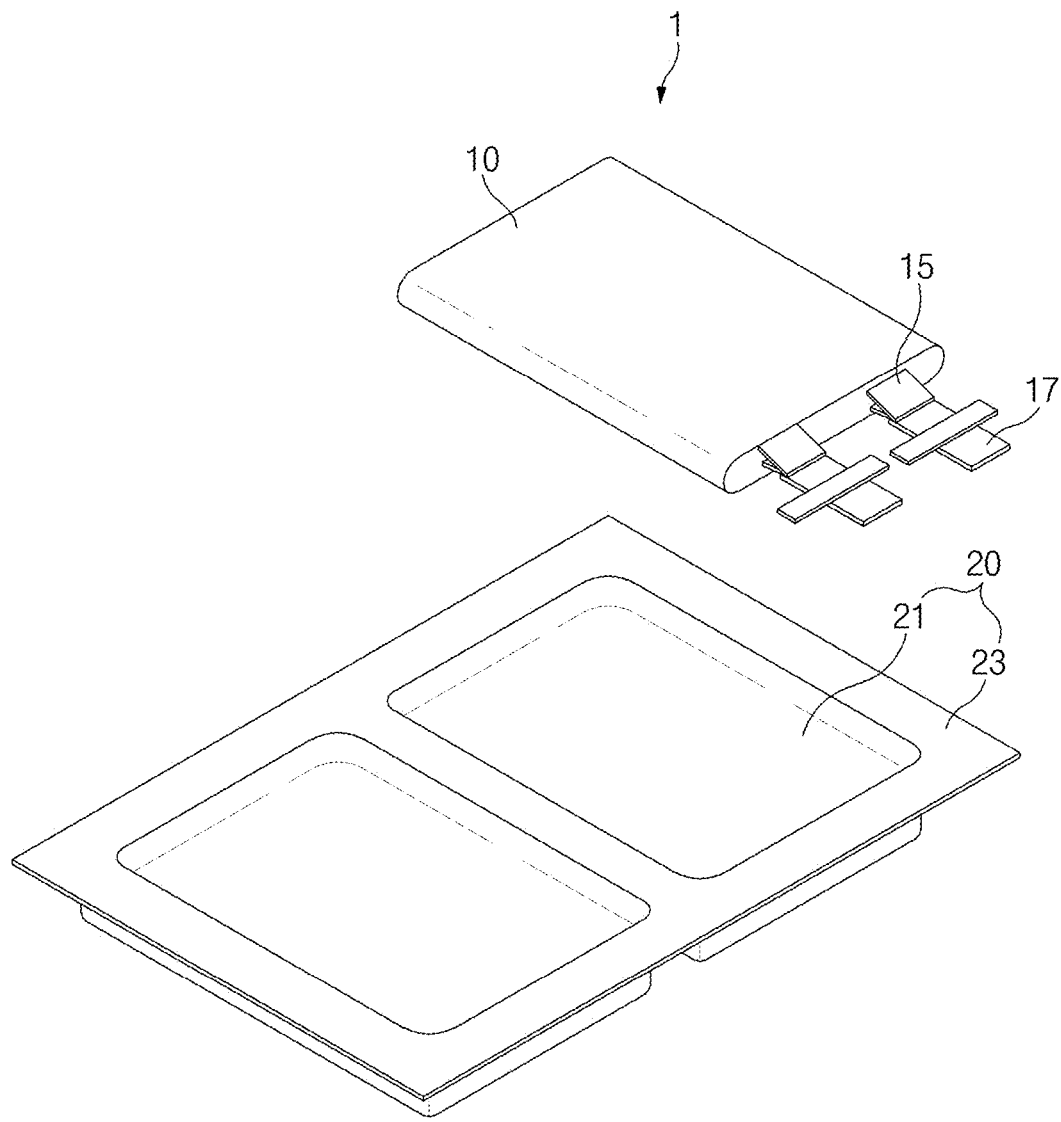
FIG. 1 illustrates an example of a pouch-type secondary battery.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain some embodiments of the present invention, detailed descriptions of portions that are irrelevant to the description or related known technologies that may unnecessarily obscure the gist of some embodiments of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

First, a process of welding electrode tabs of a pouch-type secondary battery will be described with reference to FIGS. 2A to 2D. FIGS. 2A to 2D are views for explaining one exemplary process capable of being applied to welding of electrode tabs of a pouch-type secondary battery.

Figure 2A:
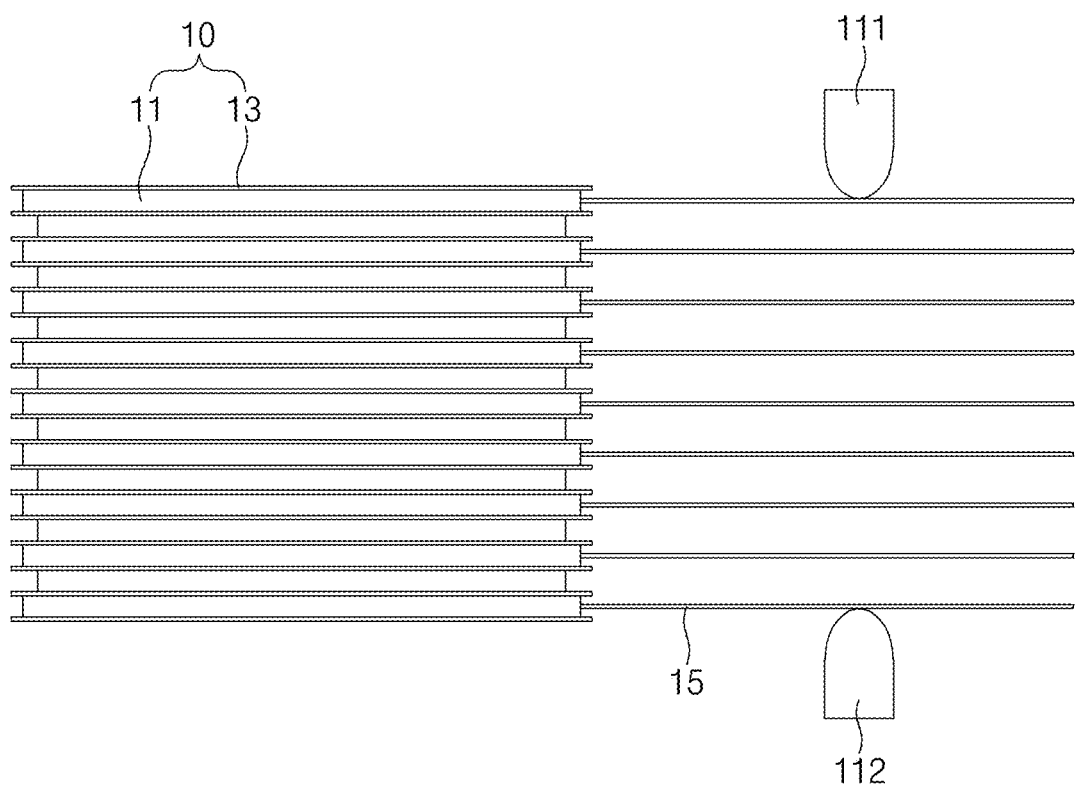
FIGS. 2A to 2D are side elevation views illustrating one exemplary process capable of being applied to welding of electrode tabs of a pouch-type secondary battery.
Figure 2B:
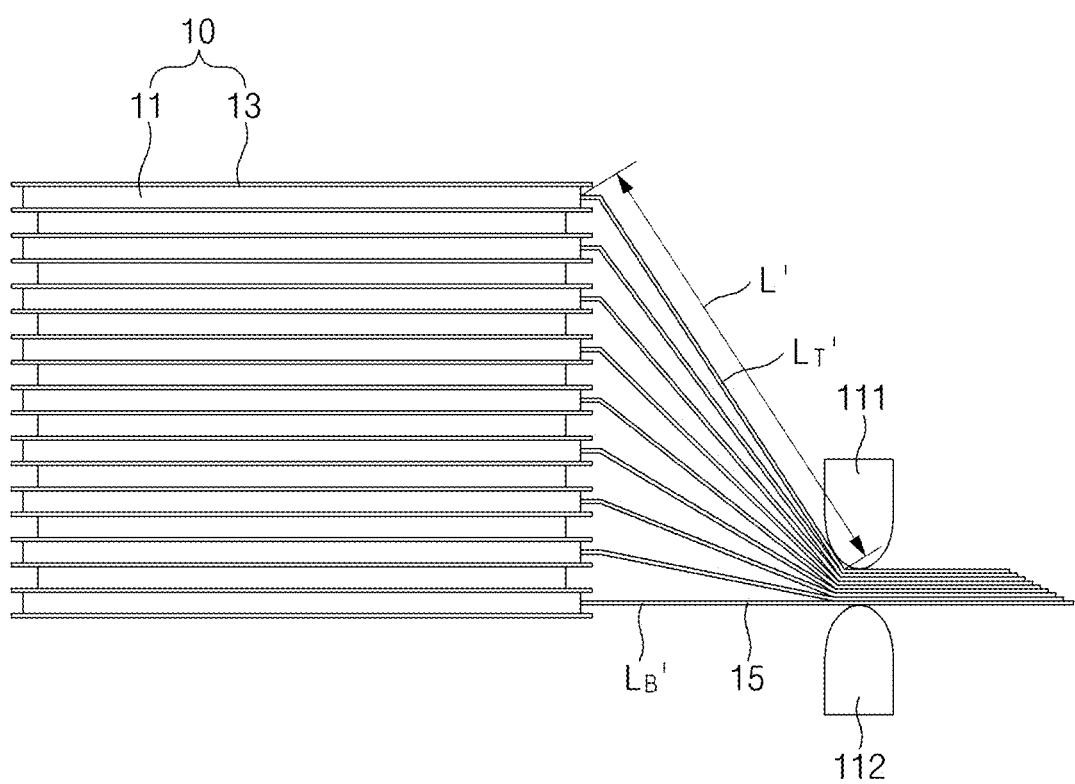
Figure 2C:
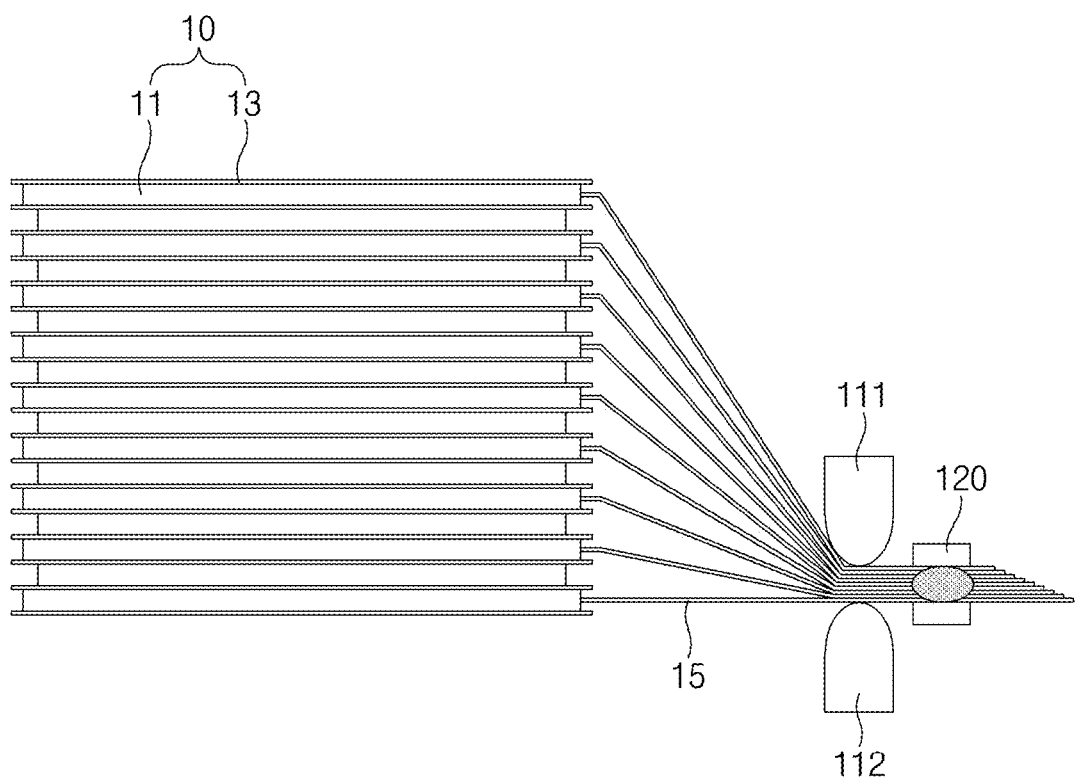

First, the electrode assembly 10 is prepared as illustrated in FIG. 2A. The electrode assembly 10 may be provided by stacking electrodes 11 and separators 13. The electrode 11 includes a positive electrode and a negative electrode. An electrode tab 15 may be connected to the electrode 11. For reference, only the negative electrode tab 15 connected to the negative electrode is illustrated in FIG. 2A for convenience of description. The positive electrode tab connected to the positive electrode may also be provided in the electrode assembly 10 to extend in a direction different from an extension direction of the negative electrode tab 15, and may be welded in the same manner as the negative electrode tab. Next, the electrode tabs 15 are gathered as illustrated in FIG. 2B. For example, the electrode tabs 15 may be gathered by pressing the electrode tabs 15 using two rods 111 and 112. Next, the electrode tabs 15 are welded through a welding part 120 as illustrated in FIG. 2C.

Figure 2D:
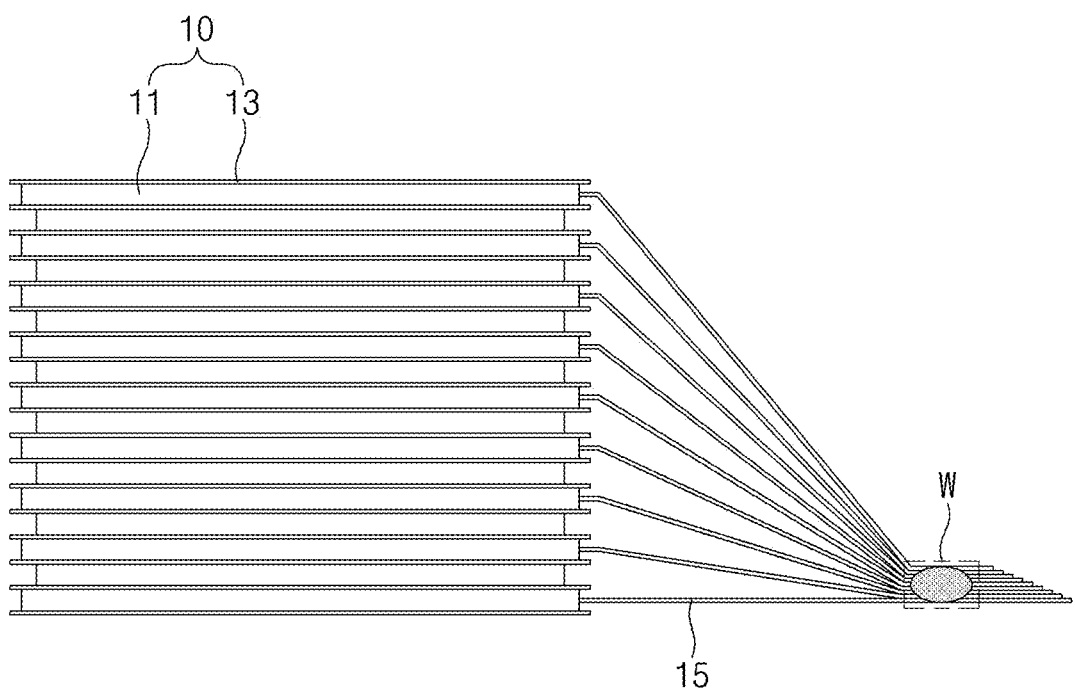

As illustrated in FIG. 2D, an electrode assembly 10, in which the electrode tabs 15 welded to each other on a predetermined welding area W are provided, may be manufactured through these processes. After connecting an electrode lead 17 (see FIG. 1) to the electrode tabs 15, the electrode assembly 10 may be accommodated in the pouch 20 (see FIG. 1) to manufacture the pouch-type battery 1.

Figure 3:
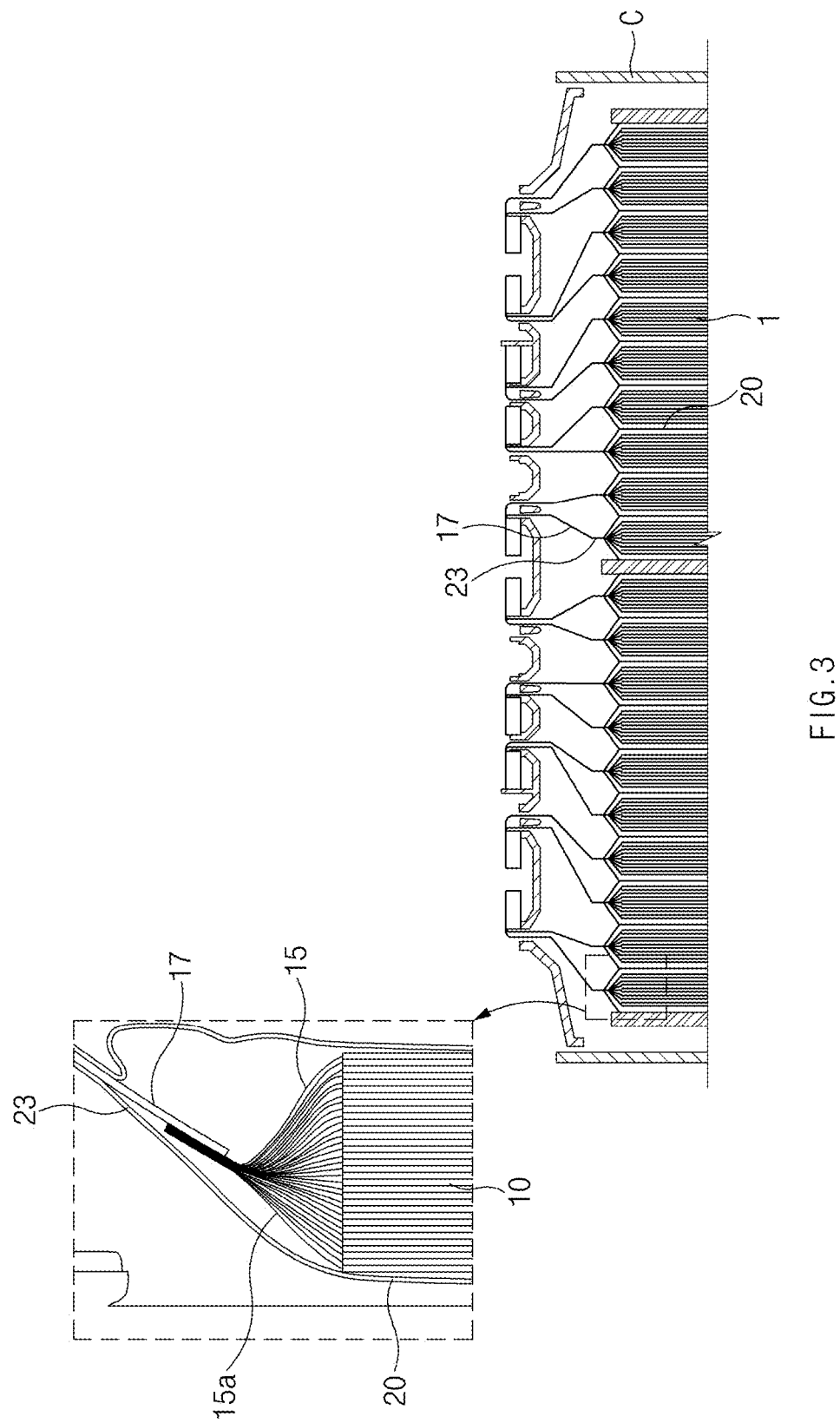
FIG. 3 is a cross-sectional view illustrating a portion of a battery module provided so that several pouch-type batteries are accommodated in a case.

As illustrated in FIG. 3, several pouch-type batteries 1 may be accommodated in one case C and manufactured as a battery module. FIG. 3 is a cross-sectional view illustrating a portion of the battery module provided so that the several pouch-type batteries are accommodated in the case.

However, a peripheral portion 23 of the pouch 20 may be bent during the manufacturing of the battery module. Deformation of the peripheral portion 23 may cause bending of the electrode lead 17 to apply pulling force to the electrode tabs 15 connected to the electrode lead 17 (for example, see electrode tabs 15a in FIG. 3). The force may tightly pull the electrode tabs 15 causing disconnection of the electrode tabs 15. The force may be larger in the outer electrode tab 15a. Even when the battery is expanded, the above disconnection problem may occur.

The present invention, which will be described in detail below, is intended to solve the above disconnection problem.

Embodiment 1

Figure 4:
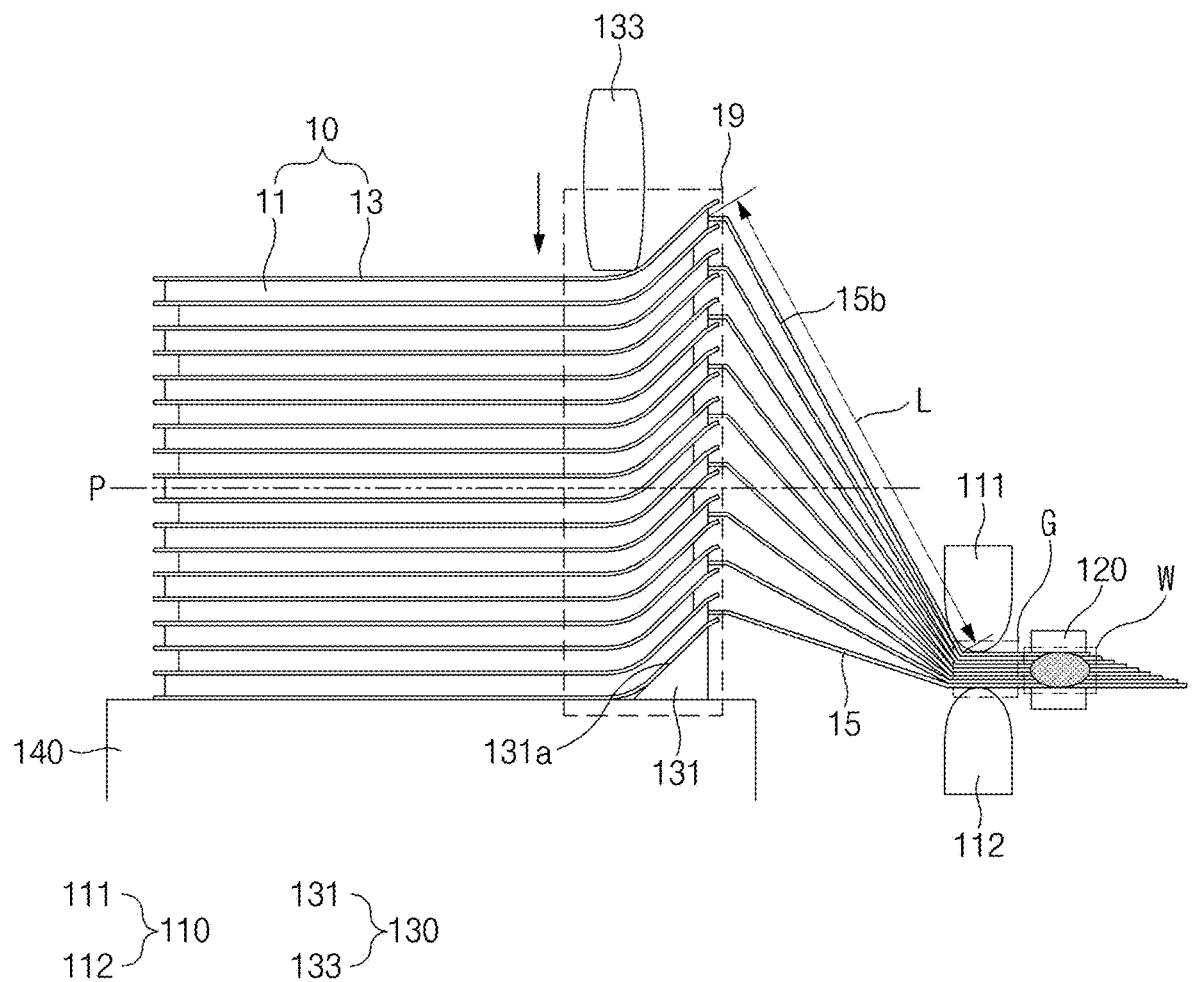
FIG. 4 is a side elevation view illustrating an apparatus for welding an electrode tab according to Embodiment 1 of the present invention.

FIG. 4 is a view illustrating an apparatus for welding an electrode tab according to Embodiment 1 of the present invention. An apparatus for welding an electrode tab according to Embodiment 1 of the present invention relates to an apparatus for welding electrode tabs 15 protruding from an electrode assembly 10 to each other, and includes a guide part 110, a welding part 120, and a bending part 130 as illustrated in FIG. 4. For reference, hereinafter, it is assumed that electrodes 11 and separators 13 of the electrode assembly 10 are stacked in a vertical direction perpendicular to the ground. However, this is merely an example, and the stacking direction of the electrodes 11 and the separators 13 may vary depending on a direction in which the electrode assembly 10 is viewed. The contents of this embodiment may be applied to other embodiments if the contents do not conflict with each other.

The guide part 110 may be configured to gather the electrode tabs 15 on a predetermined gathering area G. For example, the guide part 110 may include a first rod 111 disposed above the electrode tabs 15 and a second rod 112 disposed below the electrode tabs 15. The first rod 111 and the second rod 112 may move toward each other to press the electrode tabs 15, thereby gathering the electrode tabs 15 on the gathering area G. In this process, the electrode tabs 15 may be bent toward the gathering area G. Here, the gathering area G may be an area on which the electrode tabs 15, which are spaced apart from each other, are gathered with each other by the guide part 110. For reference, the guide part may be implemented with a first press (not shown) that is stationary and a second press (not shown) that moves toward the first press.

The welding part 120 may be configured to weld the electrode tabs 15 gathered by the guide part 110. For example, the welding part 120 may include a horn and an anvil for performing ultrasonic welding. The electrode lead 17 (see FIG. 1) provided to supply electricity to the outside of the battery may be welded to the electrode tabs 15 welded by the welding part 120. For reference, although the guide part 110 and the welding part 120 are illustrated separately in FIG. 4, the guide part and the welding part may be connected to each other. For example, the first rod may be connected to the horn of the welding part, and the second rod may be connected to the anvil of the welding part.

The bending part 130 may be configured to bend the electrode assembly 10. The bending part 130 may increase the reference length L of all or portion of the electrode tabs 15 through the bending. Here, the reference length L may be a 'length from the electrode assembly 10 to the gathering area G' of the electrode tab 15.

Figure 5:
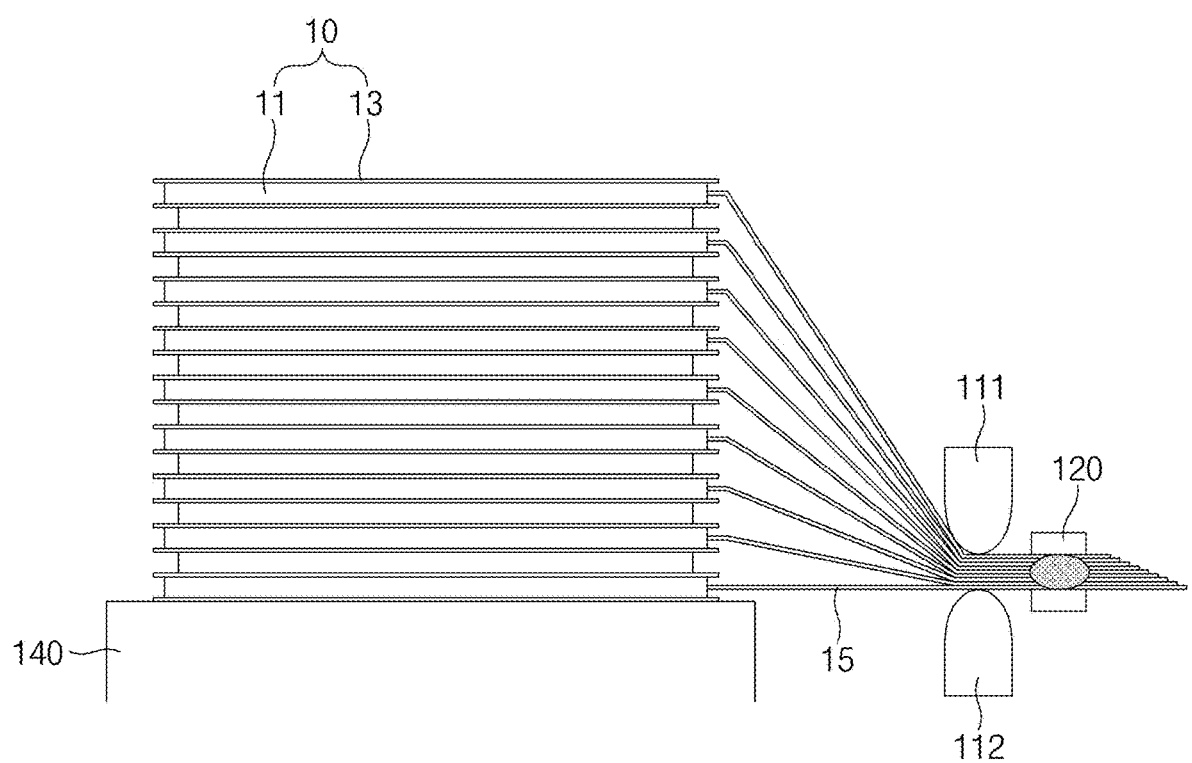
FIG. 5 is a side elevation view illustrating an electrode assembly, which is not bent, as compared to the electrode assembly illustrated in FIG. 4.

For example, when the electrode assembly 10 of FIG. 5 is bent upward, as illustrated in FIG. 4, since a right edge 19 of the electrode assembly 10 ascends, a left end of the electrode tab 15 (i.e., an end connected to the electrode assembly) may be pulled upward to increase in 'length L from the electrode assembly 10 to the gathering area G'. Here, a remaining portion of the electrode tab 15 (e.g., a portion of the electrode tab, which is disposed at a right side of a point pressed by the first and second rods in FIG. 5) may also be pulled to a left side. FIG. 5 is a view illustrating an electrode assembly, which is not bent, in comparison with the electrode assembly illustrated in FIG. 4. For reference, the guide part 110 may press the electrode tabs 15 to a degree that allows the electrode tabs 15 to be pulled. For this, the guide part may include a roller (not shown) at a side that is in contact with the electrode tabs. For example, the roller that is in contact with the electrode tabs to rotate may be provided on a lower end of the first rod and/or an upper end of the second rod.

When the electrode tabs 15 are welded in a bent state or in a state after being bent, as a 'length L from the electrode assembly 10 to the gathering area G' in at least a portion of the electrode tabs 15 increases, a 'length from the electrode assembly 10 to the welding area W' in at least a portion of the electrode tabs 15 may increase. As described above, the increase in length may prevent the electrode tab 15 from disconnecting by being pulled tightly. This is because, due to the increase in length, the electrode tab 15 is tightly pulled only when the electrode tab 15 is pulled more than before the increase in length. For reference, the force applied to the electrode lead 17 (see FIG. 1) may be transmitted to the electrode tabs 15 through a connection point between each of the electrode tabs 15 and the electrode lead 17.

In the apparatus for welding the electrode tab according to this embodiment, before welded by the welding part 120, the length from the electrode assembly 10 to the gathering area G in at least a portion of the electrode tabs 15 increases. As a result, since the apparatus includes the bending part 130 configured to bend the electrode assembly 10, in the case of the battery manufactured by the apparatus for welding the electrode tab according to this embodiment, even if the pulling force is applied to the electrode tabs 15 due to the deformation of the peripheral portion 23 (terrace) of the pouch 20, or even if the pulling force is applied to the electrode tabs 15 due to the expansion of the battery, the electrode tab 15 may not disconnect.

The bending part 130 according to this embodiment may determine a degree of bending of the electrode assembly 10 in consideration of the increase in length required to prevent the disconnection from occurring. For example, in the case of the battery module in which the peripheral portion 23 of the pouch 20 is greatly deformed, the bending part 130 may further bend the electrode assembly 10. The adjustment may be achieved by adjusting a size of a support block 131 to be described later.

The gathering area G may be a plane parallel to the ground and may be disposed below a reference plane P passing through a center of the electrode assembly 10 in the vertical direction. The guide part 110 may gather the electrode tabs 15 on the gathering area G. Here, the bending part 130 may bend an edge 19 of the electrode assembly 10, to which the electrode tabs 15 are connected, upward. In FIG. 4, the gathering area G disposed to correspond to the lowermost side of the electrode assembly 10 is illustrated.

When the edge 19 of the electrode assembly 10 is bent upward, before the bending, in the electrode tab (e.g., electrode tab 15*b*) disposed on the plane passing through the gathering area G parallel to the ground, or disposed above the plane, the above-described reference length L may further increase than that before the bending of the electrode assembly 10. As the gathering area G is disposed lower than a reference plane P, the number of electrode tabs 15 of which the reference length L increases by the bending part 130 may increase. For reference, here, upper and lower sides may be relative concepts. For example, when the gathering area is disposed above the reference plane P, the bending part 130 may bend the edge 19 of the electrode assembly 10 downward.

The bending part 130 according to this embodiment may include a support block 131 supporting one of either the bottom and top surfaces of the electrode assembly 10. The bending part 130 according to this embodiment may include a pressing block 133 that presses the other of the bottom and top surfaces of the electrode assembly 10 toward the above-described one. The pressing block 133 may be configured to move in the vertical direction so as to perform the pressing.

In FIG. 4, the support block supporting the bottom surface of the electrode assembly 10 and the pressing block 133 pressing the top surface of the electrode assembly 10 toward the bottom surface are illustrated.

Since the electrode assembly 10 is bent only by the support block 131, the bending part 130 may include only the support block 131. However, since the electrode assembly 10 is more easily bent when the electrode assembly 10 is pressed with the pressing block 133 in a state of being supported by the support block 131, the bending part 130 may include both the support block 131 and the pressing block 133.

A point at which the support block 131 supports the electrode assembly 10 may be closer to an outer side of the electrode assembly 10 than a point at which the pressing block 133 presses the electrode assembly 10. For example, in FIG. 4, a point at which the support block 131 supports the bottom surface of the electrode assembly 10 is disposed at a further right side than a point at which the pressing block 133 presses the top surface of the electrode assembly 10. Through this positional relationship, the bending part 130 according to this embodiment may effectively bend the edge 19 of the electrode assembly 10 upward or downward.

As illustrated in FIG. 4, the support block 131 may be configured to support the edge 19 of the electrode assembly 10 to which the electrode tabs 15 are connected from below. The pressing block 133 may be configured to press the edge 19 of the electrode assembly 10 supported by the support block 131 downward from above so as to perform the bending.

The support block 131 may be implemented in various shapes capable of supporting the electrode assembly 10. For example, as illustrated in FIG. 4, the support block 131 may be implemented in a shape including an inclined surface 131*a* supporting a lower side of the edge 19 of the electrode assembly 10. The inclined surface 131*a* of the support block 131 may be a surface disposed below the edge 19 and gradually increasing in height toward the outside of the electrode assembly 10 (e.g., the right side of FIG. 4). When the support block 131 includes the inclined surface 131*a*, it is possible to support the edge 19 of the electrode assembly 10 while preventing the edge 19 of the electrode assembly 10 from being damaged. The pressing block 133 may also be implemented in various shapes capable of pressing the electrode assembly 10. In FIG. 4, a rod-shaped pressing block 133 is illustrated.

Hereinafter, a process of welding the electrode tabs 15 through the welding apparatus according to this embodiment will be described with reference to FIGS. 6A to 6E. FIGS. 6A to 6E are views for explaining a method for welding electrode tabs through the welding apparatus of FIG. 4.

Figure 6A:
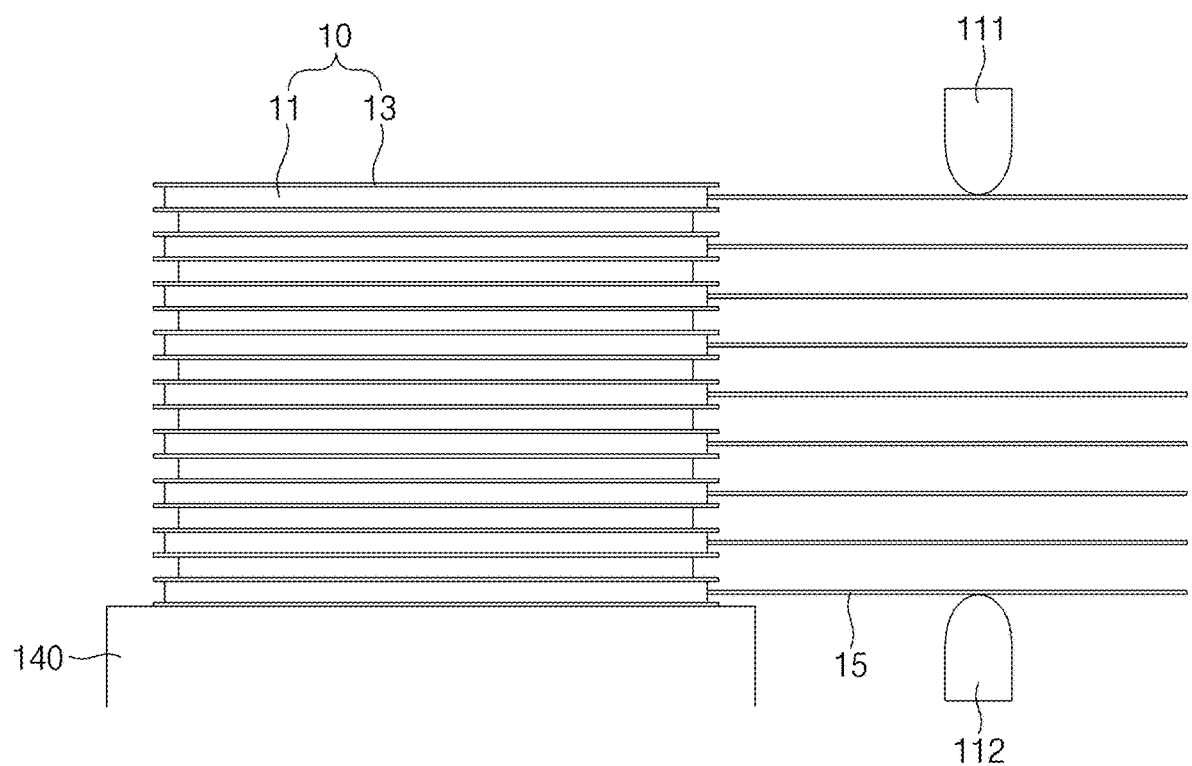
FIGS. 6A to 6E are side elevation views for explaining a method for welding electrode tabs through the welding apparatus of FIG. 4.

First, an electrode assembly 10 is prepared as illustrated in FIG. 6A. Here, the electrode assembly 10 may be seated on a seating part 140. The seating part 140 may be a jig or die on which the electrode assembly 10 is seated.

Figure 6B:
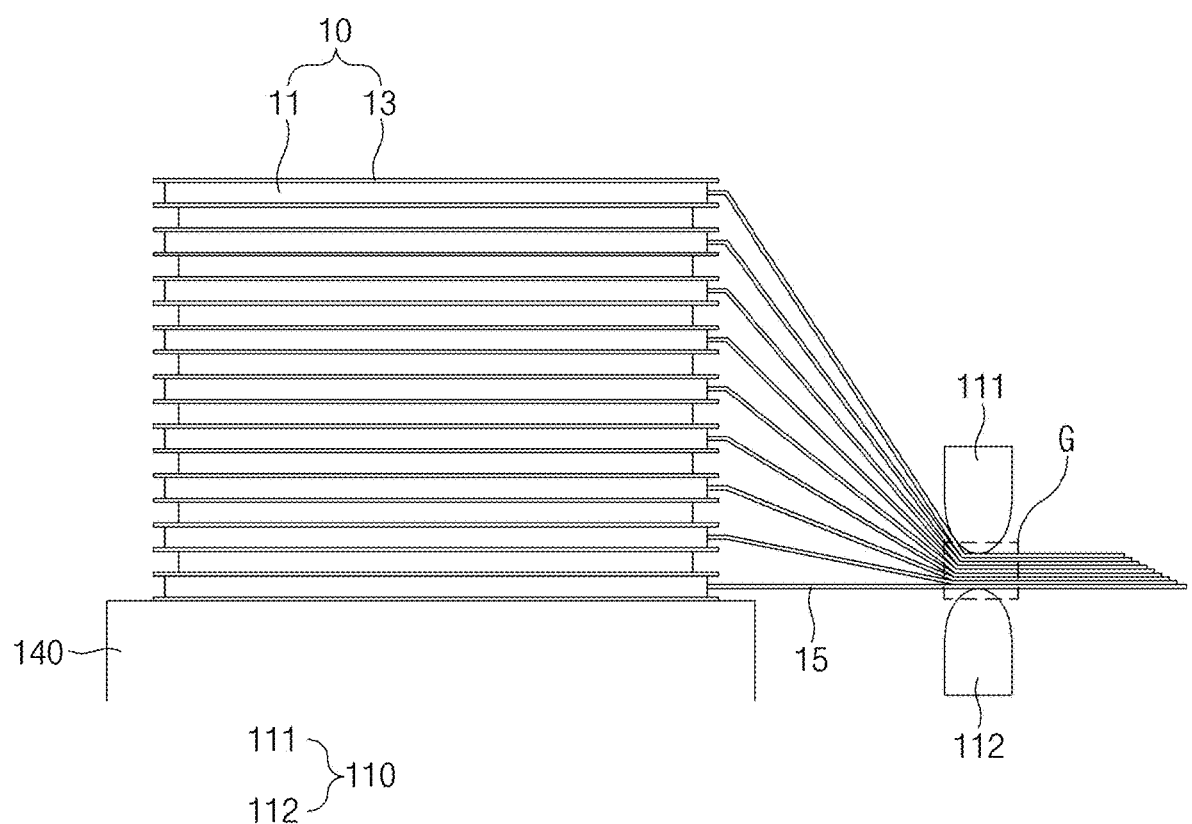

Next, the electrode tabs 15 are gathered as illustrated in FIG. 6B. This may be implemented by an operation of the guide part 110. For example, in a state in which the second rod 112 supports the electrode tabs 15 from below, the first rod 111 may press the electrode tabs 15 below from above so that the electrode tabs 15 are gathered in the gathering area G.

Figure 6C:
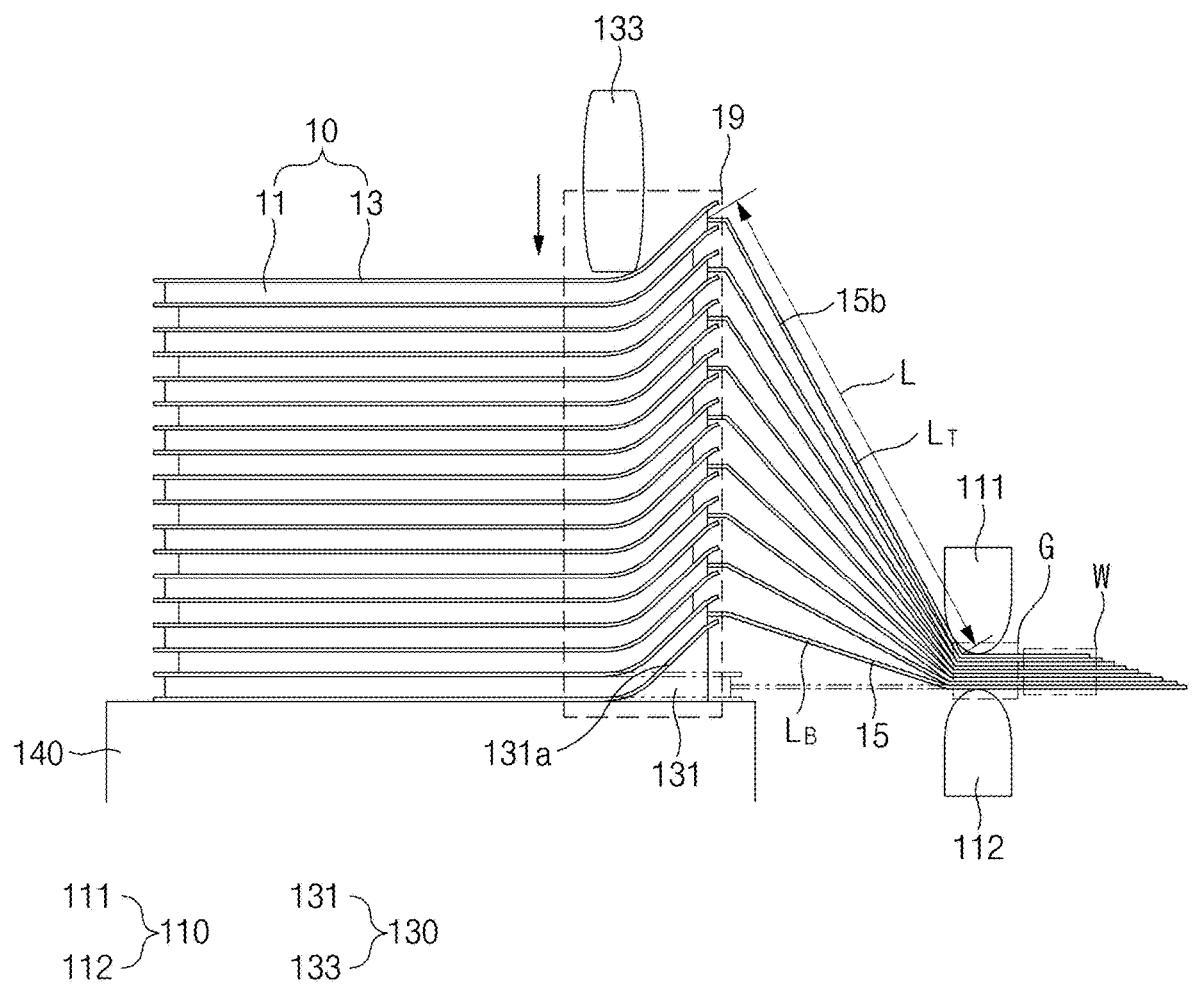

Next, the electrode assembly 10 is bent as illustrated in FIG. 6C. This may be implemented by an operation of the bending part 130. The bending part 130 may bend an edge 19 of the electrode assembly 10 to which the electrode tab 15 is connected. For example, in the state in which the support block 131 supports a right bottom surface of the edge 19, the pressing block 133 may press a right top surface of the edge 19 to bend the edge 19 of the electrode assembly 10. For reference, when the electrode assembly 10 is seated on the seating part 140, the support block 131 may already be disposed on a top surface of the seating part 140. Alternatively, the support block may be configured to protrude from the inside of the seating part to the top surface of the seating part.

Figure 6D:
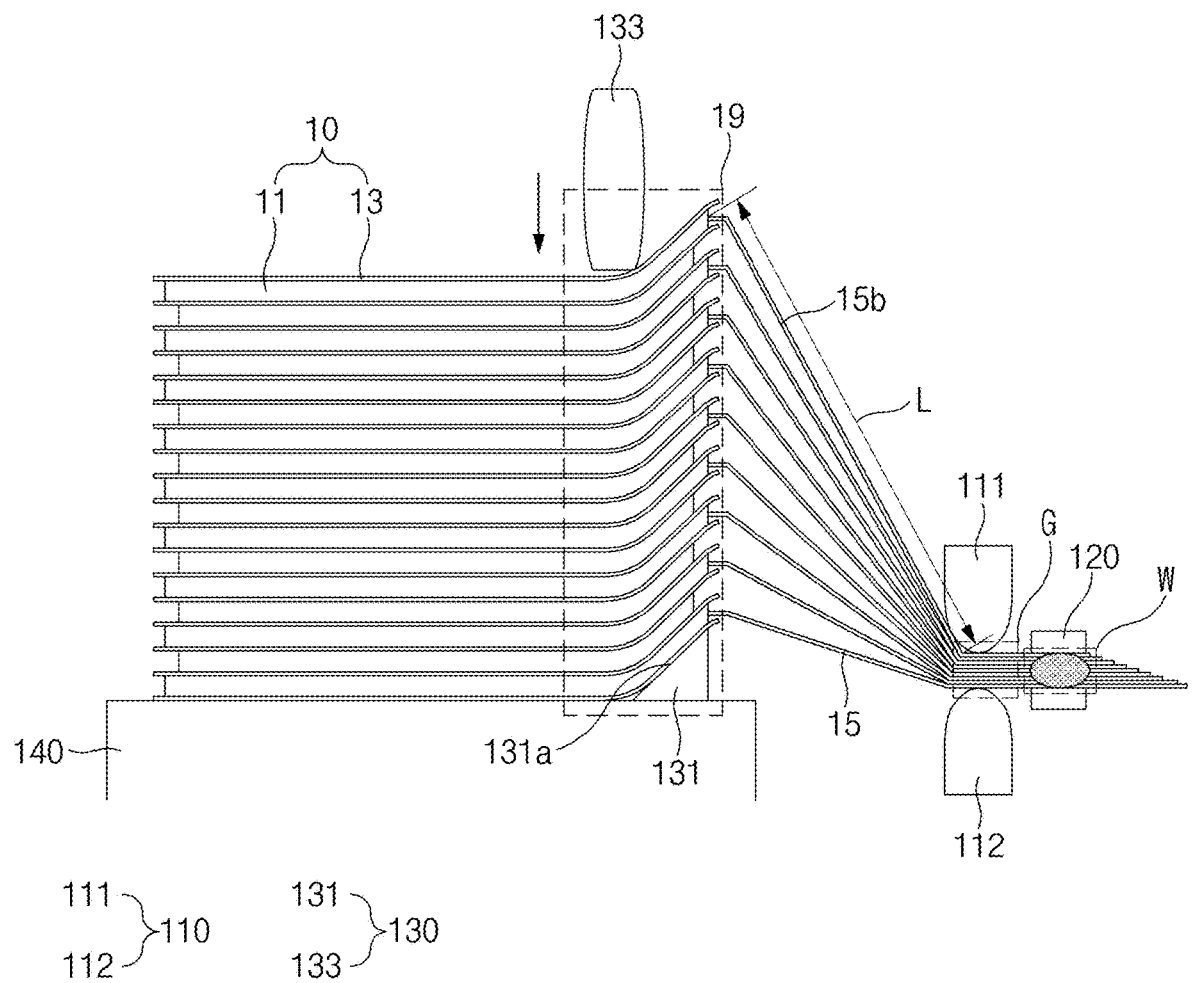

Next, as illustrated in FIG. 6D, the electrode tabs 15 are welded through the welding part 120 in the state in which the electrode assembly 10 is bent.

Figure 6E:
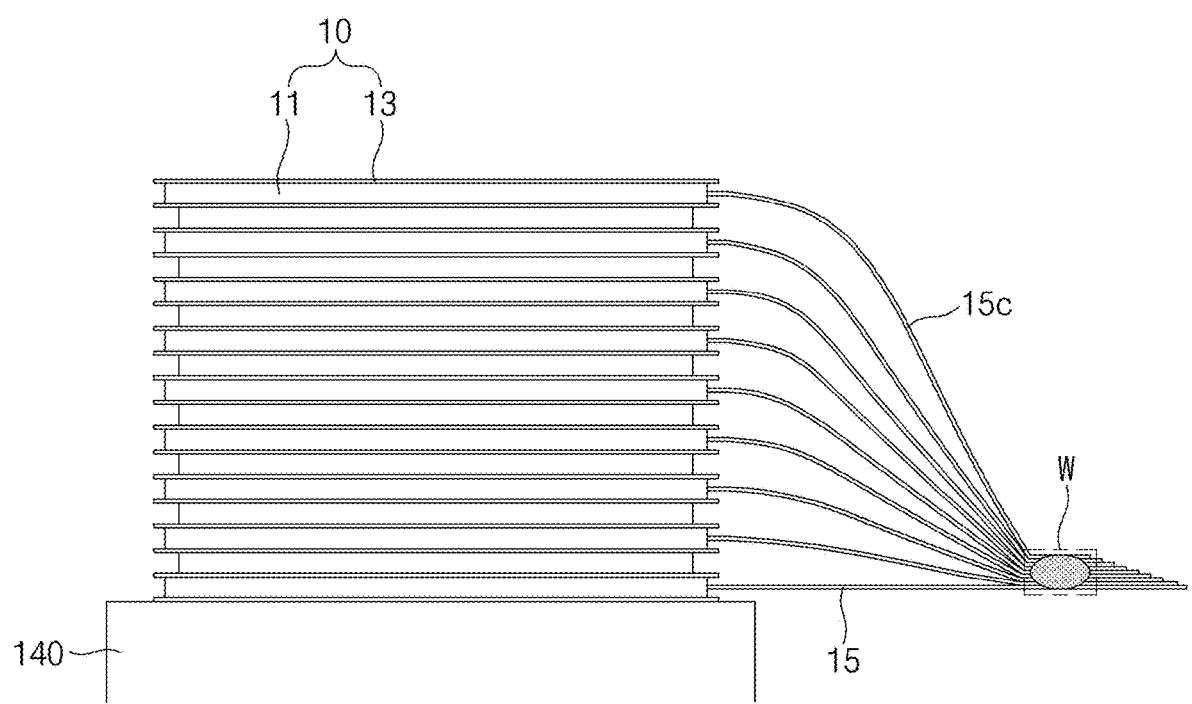

Through this process, in the case of at least a portion of the electrode tabs 15, the 'length L from the electrode assembly 10 to the gathering area G' may increase, and in this state, the electrode tabs 15 may be welded to each other. As a result, in the case of at least a portion of the electrode tabs 15 (e.g., the electrode tab 15c), as illustrated in FIG. 6E, the welding area W may increase in comparison to a case in which there is no bending process. For reference, although a process of bending the electrode assembly 10 after gathering the electrode tabs 15 is illustrated in FIGS. 6A to E, it is also possible to gather the electrode tabs 15 after bending the electrode assembly 10.

After the welding, the force applied to the electrode assembly 10, so as to bend the electrode assembly 10, may be removed. For example, the support block 131 may be removed, and the pressing block 133 may move upward. The electrode assembly 10 may return to its original shape by removing the force. Since each of the electrodes 11 and the separators 13, which constitute the electrode assembly 10, has a certain degree of elasticity, each of the electrodes 11 and the separators 13 may be bent by applying the force due to the bending part 130 and return to its original shape by removing the force.

Embodiment 2

Figure 7:
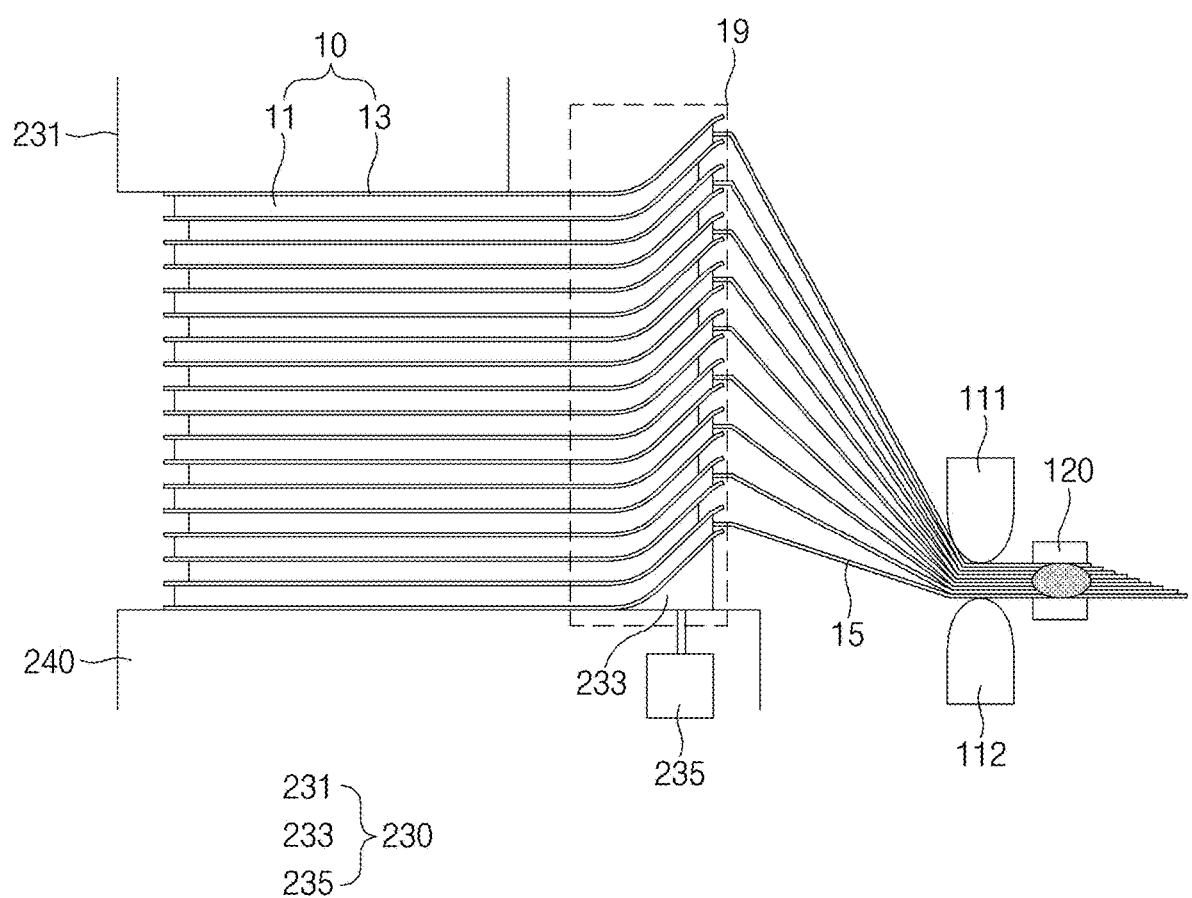
FIG. 7 is a side elevation view illustrating an apparatus for welding an electrode tab according to Embodiment 2 of the present invention.

FIG. 7 is a view illustrating an apparatus for welding an electrode tab according to Embodiment 2 of the present invention. The welding apparatus according to Embodiment 2 is different from the welding device according to Embodiment 1 as it relates to a support block and a pressing block. Hereinafter, the support block and the pressing block will be primarily described. For reference, the contents of this embodiment may be applied to other embodiments if the contents do not conflict with each other.

A bending part 230 according to this embodiment may include a pressing block 233 protruding from a seating part 240 on which the electrode assembly 10 is seated. The pressing block 233 is disposed inside the seating part 240 and protrudes to a top surface of the seating part 240, on which a bottom surface of the electrode assembly 10 is seated, to press the electrode assembly 10. Here, the pressing block 233 may press an edge 19 of the electrode assembly 10, to which the electrode tabs 15 are connected to each other, from below. Since the electrode assembly 10 is seated on the seating part 240, and then, the pressing block 233 protrudes, the pressing by the pressing block 233 may be performed when necessary (for example, after the electrode assembly is seated on the seating part) while the electrode assembly 10 smoothly moves.

The bending part 230 according to this embodiment may include a driving part 235 for vertical movement of the pressing block 233. For example, the driving part 235 may be a cylinder from which a cylinder rod is drawn in or out.

The bending part 230 according to this embodiment may include a support block 231 to support the electrode assembly 10 during the pressing by the pressing block 233. The support block 231 may be configured to partially support a top surface of the electrode assembly 10. The support block 231 may support an area other than an area pressed by the pressing block 233 so as not to interfere with the bending of the electrode assembly 10. For example, when the pressing block 233 presses the edge 19 of the electrode assembly 10, the support block 231 may be configured to support the top surface of the electrode assembly 10 on an area except for the edge 19 of the electrode assembly 10. The support block 231 may be configured to move in a vertical direction so as not to interfere with the seating of the electrode assembly 10.

Embodiment 3

Figure 8:
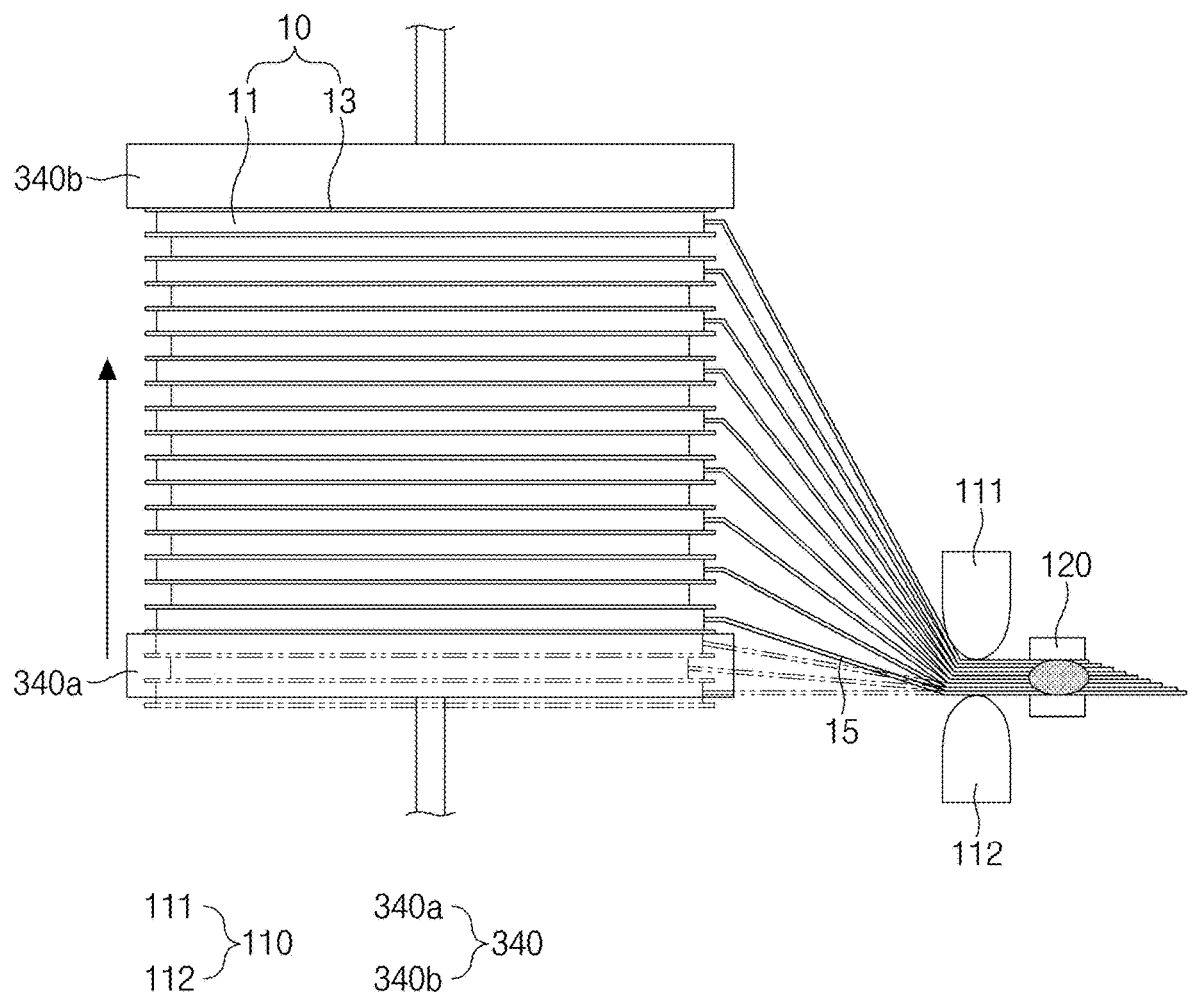
FIG. 8 is a side elevation view illustrating an apparatus for welding an electrode tab according to Embodiment 3 of the present invention.

FIG. 8 is a view illustrating an apparatus for welding an electrode tab according to Embodiment 3 of the present invention. A welding apparatus according to Embodiment 3 is different from the welding apparatus according to the above-described embodiments as it relates to a 'length from an electrode assembly to a gathering area' on an electrode tab. For reference, the contents of this embodiment may be applied to other embodiments if the contents do not conflict with each other.

An apparatus for welding an electrode tab according to this embodiment relates to an apparatus for welding electrode tabs protruding from the electrode assembly and may include a guide part 110, a welding part 120, and a moving part 340. The guide part 110 and the welding part 120 may be the same as the guide part 110 and the welding part 120 described above.

The moving part 340 may be configured to move the electrode assembly 10 with respect to the guide part 110 in a direction (vertical direction in FIG. 8) corresponding to a stacking direction of electrodes 11 and separators 13 of the electrode assembly 10. Due to the relative movement, the moving part 340 may, for example, move the electrode assembly 10 in a direction away from the guide part 110 at an upper side in FIG. 8 and move the guide part 110 in a direction away from the electrode assembly 10 at a lower side in FIG. 8. In FIG. 8, the moving part 340 configured to move the electrode assembly 10 is illustrated.

Since the moving part 340 moves the electrode assembly 10 as a whole with respect to the guide part 110 before welded by the welding part 120, a length 'from the electrode assembly 10 to a gathering area (reference symbol G of FIG. 6B)' in at least a portion of the electrode tabs 15 may increase, similar to a case in which the electrode assembly 10 is bent in the foregoing embodiments. In an embodiment of FIG. 8, a length of each of all electrode tabs 15 may increase.

The moving part 340 may include a seating part 340a configured to move along a stacking direction of the electrode assembly 10 in a state in which the electrode assembly 10 is seated. The moving part 340 may include a support part 340b supporting the electrode assembly 10 in a direction opposite to the seating part 340a. The moving part 340 may stably move the electrode assembly 10 via the support part 340b. In a state in which the electrode assembly 10 is pressed toward the seating part 340a, the support part 340b may be configured to move in a manner interlocked with the movement of the seating part 340a.

Embodiment 4

Embodiment 4 relates to a secondary battery and may relate to a secondary battery manufactured by the above-described welding apparatus/method. However, the apparatus/method for manufacturing the secondary battery according to Embodiment 4 is not limited to the apparatus/method described above.

As illustrated in FIG. 6C, the secondary battery according to this embodiment may include an electrode assembly 10 and electrode tabs 15 protruding from the electrode assembly 10. In addition, the secondary battery according to this embodiment may include an exterior material 20 (see FIG. 1) accommodating the electrode assembly 10 and the electrode tabs 15, and an electrode lead 17 electrically connected to the electrode tabs 15 (see FIG. 1). A portion of the electrode lead 17 may be exposed to the outside of the exterior material 20.

The electrode tabs 15 may be coupled to each other in a predetermined bonding area. The bonding area may be the above-described welding area W.

A length of at least a portion of the electrode tabs 15 'from the electrode assembly 10 to the bonding area W' (see FIG. 6E) may be longer than a predetermined reference length. Here, the length 'from the electrode assembly 10 to the bonding area W' is the sum of a length L from the electrode assembly 10 to the above-mentioned gathering area G, and a length from the gathering area G to the bonding area W (welding area). The reference length may be a minimum length from the electrode assembly 10 to the bonding area W (see FIG. 2D). The reference length may be determined for each individual electrode tab. For example, the reference length may be calculated as a straight-line length from a point at which the corresponding electrode tab protrudes from the electrode assembly 10 to a point at which the corresponding electrode tab is bonded to another electrode tab. Here, if necessary for calculating the exact straight-line length, the reference length may be calculated in a state in which the electrode tab is pulled tightly, for example, in a state in which a bonding point is pulled in a direction away from the electrode assembly.

For example, the 'sum of a length $L_T$ from the electrode assembly 10 to the gathering area G and a length from the gathering area G to the welding area W' on the uppermost electrode tab of the electrode tabs of FIG. 6C may be greater than the 'sum of a length $L_T$' from the electrode assembly 10 to the gathering area and a length from the gathering area to the welding area (see FIG. 2D)' on the electrode tab disposed at the uppermost side among the electrode tabs of FIG. 2B. Similarly, the 'sum of a length $L_B$ from the electrode assembly 10 to the gathering area G and a length from the gathering area G to the welding area W' on the lowermost electrode tab of the electrode tabs of FIG. 6C may be greater than the 'sum of a length $L_B$' from the electrode assembly 10 to the gathering area and a length from the gathering area to the welding area' on the electrode tab disposed at the lowermost side among the electrode tabs of FIG. 2B. For reference, in the above examples, the 'lengths from the gathering area to the welding area' may be the same.

The incremental length of at least a portion of the electrode tabs 15 'from the electrode assembly 10 to the bonding area W' may increase as the electrode tab is disposed farther from the bonding area W along the stacking direction (vertical direction in FIG. 6C) of the electrodes and the separators. In FIG. 6C, since the bonding area W is disposed corresponding to the lowermost side of the electrode assembly 10 in the vertical direction, the incremental length of the lowermost electrode tab is the shortest, and the incremental length of the uppermost electrode tab is the longest.

Here, the incremental length may be a value obtained by subtracting the above-described reference length from the length from the electrode assembly 10 to the bonding area W. For example, the incremental length of the lowermost electrode tab in FIG. 6C may be a value obtained by subtracting 'the length $L_B$' from the electrode assembly 10 to the gathering area+the length from the gathering area to the bonding area' in FIG. 2B from 'the length $L_B$ from the electrode assembly 10 to the gathering area G+the length from the gathering area G to the bonding area W'.

In the case of the embodiment of FIG. 6C, the bonding area W may be disposed corresponding to the lowermost electrode tab of the electrode assembly 10 based on the vertical direction (the stacking direction of the electrodes and the separators). Here, the incremental length of each of the electrode tabs may be longer as the electrode tab is disposed vertically upward from the lowermost electrode tab. For example, the incremental length of the electrode tab disposed at the lowest side may be the shortest, and the incremental length of the electrode tab disposed at the uppermost side may be the longest. For reference, FIG. 6C may be applied to a pouch-type battery in which only one cup part for accommodating an electrode assembly is formed.

In FIG. 6C, when a horizontal length of the support block 131 (length of a surface horizontally disposed on a top surface of the seating part) is X (unit is mm, hereinafter the same), and a vertical length of the support block 131 (length of a surface perpendicular to the top surface of the seating part) is Y, the length of the 'electrode assembly 10 to the bonding area W' (see the 'total length' in the table below) and the incremental length of the electrode tabs, which are respectively disposed at the lower and uppermost sides, may be as shown in the table below. For reference, when Y is "0", since there is no bending by the support block 131, as in the case of FIG. 2B or 2D, it may be a criterion for calculating the incremental length. In addition, the table below relates to a positive electrode tab when a straight-line distance in the horizontal direction from the electrode assembly to the 10 gathering area G (position at which the guide part is disposed) is 2.5 mm, and a thickness of the electrode assembly is 10 mm.

TABLE 1

| Lowermost electrode tab | | | | Uppermost electrode tab | | | |
|---|---|---|---|---|---|---|---|
| X | Y | Total length | Incremental length | X | Y | Total length | Incremental length |
| 3 | 0 | 5.50 | — | 3 | 0 | 8.59 | — |
| 3 | 3 | 8.15 | 2.65 | 3 | 3 | 12.62 | 4.03 |
| 3 | 4 | 9.72 | 4.22 | 3 | 4 | 14.34 | 5.75 |
| 3 | 5 | 11.42 | 5.92 | 3 | 5 | 16.14 | 7.55 |
| 3 | 6 | 13.21 | 7.71 | 3 | 6 | 17.99 | 9.40 |
| 3 | 7 | 15.05 | 9.55 | 3 | 7 | 19.87 | 11.28 |
| 4 | 0 | 6.50 | — | 4 | 0 | 9.59 | — |
| 4 | 3 | 8.91 | 2.41 | 4 | 3 | 13.38 | 3.79 |
| 4 | 4 | 10.37 | 3.87 | 4 | 4 | 15.00 | 5.41 |
| 4 | 5 | 11.99 | 5.49 | 4 | 5 | 16.71 | 7.12 |
| 4 | 6 | 13.71 | 7.21 | 4 | 6 | 18.49 | 8.90 |
| 4 | 7 | 15.50 | 9.00 | 4 | 7 | 20.32 | 10.73 |

As summarized in Table 1, when X and Y are the same conditions, the incremental length of the upper electrode tab is greater than the incremental length of the lower electrode tab. In addition, in the case of the electrode tabs at the same position, if X is the same, the incremental length of the electrode tab increases as Y increases, and this is equally applied to the lower electrode tab and the upper electrode tab. It is seen that the incremental length increases as the edge of the electrode assembly is bent to be higher. Additionally, in the electrode tabs at the same position, if Y is the same, the incremental length increases as an angle between an inclined surface 131a of the support block 131 and the bottom surface of the support block 131 increases (for example, when X is 3, and Y is 4, and when X is 4, and Y is 4), and this may be equally applied to the lower electrode tab and the upper electrode tab. It is seen that the incremental length increases as the edge of the electrode assembly is bent to be inclined.

Figure 9:
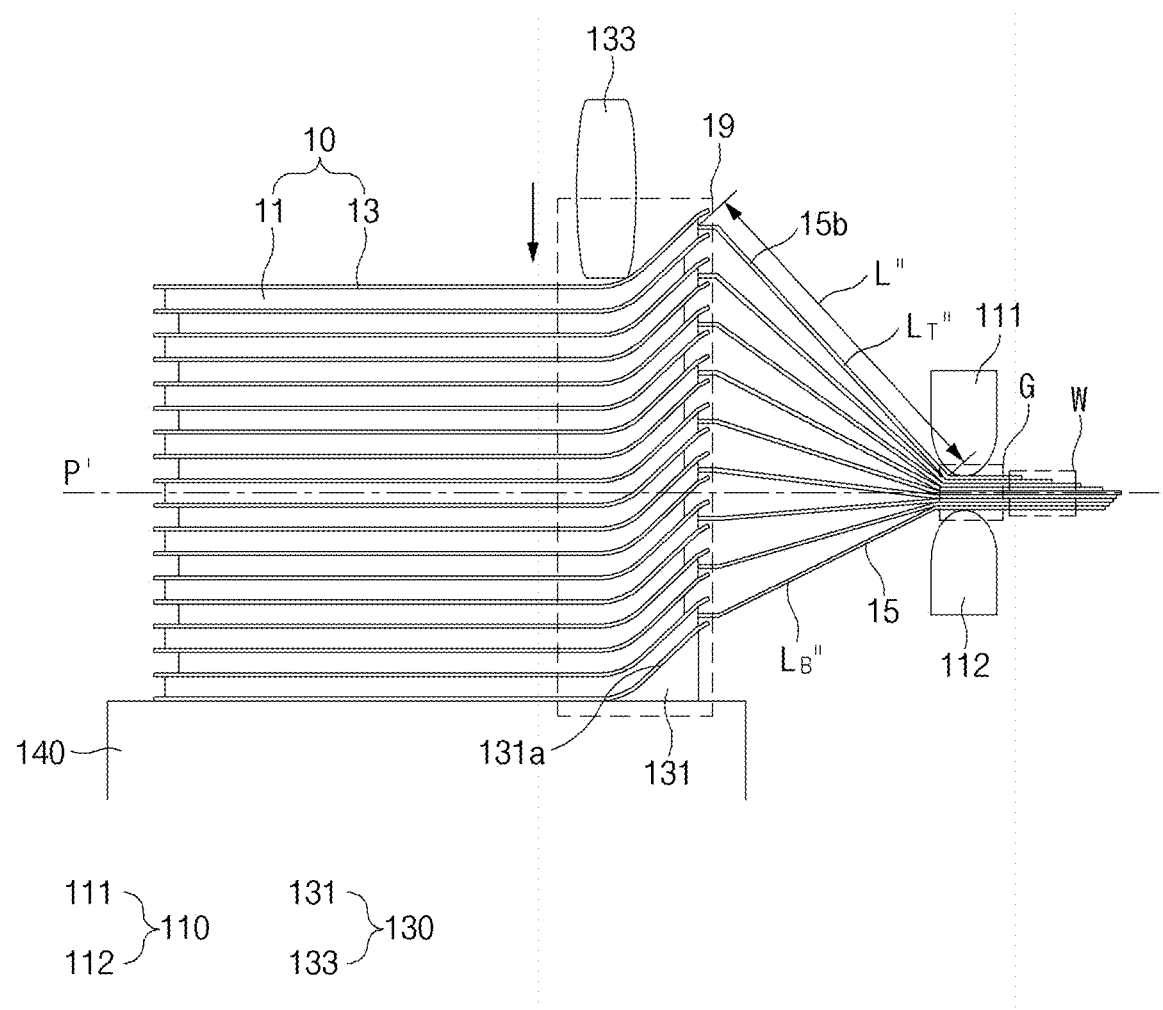
FIG. 9 is a side elevation view illustrating a modified example of a secondary battery according to Embodiment 4 of the present invention.

The secondary battery according to Embodiment 4 may be modified as illustrated in FIG. 9. FIG. 9 is a view for explaining a modified example of a secondary battery according to Embodiment 4 of the present invention.

In the case of the secondary battery described in FIG. 9, when the electrodes and the separators of the electrode assembly are stacked in the vertical direction (as in FIG. 9), the electrode tabs disposed above a reference plane P' passing through the bonding area W and perpendicular to the vertical direction, and the electrode tabs disposed below the reference plane P', have asymmetrical lengths with respect to the reference plane. For example, in the case of the secondary battery manufactured as illustrated in FIG. 9, when the support block 131 is removed, and the electrode assembly returns to its original shape, the uppermost electrode tab and the lowermost electrode tab with respect to the reference plane P' disposed at an intermediate height of the electrode assembly may be symmetrically disposed, but a length $L_T''$ of the uppermost electrode tab is greater than a length $L_B''$ of the lowermost electrode tab.

The above-disclosed subject matter is to be considered illustrative, and not restrictive, and the appended claims are intended to cover all such modifications, enhancements, and other embodiments, which fall within the true spirit and scope of the present invention.

Thus, the above embodiments of the present invention are to be considered illustrative, and not restrictive, and the technical spirit of the present invention is not limited to the foregoing embodiments.

Therefore, the scope of the present disclosure is defined not by the detailed description of the disclosure but by the appended claims, and all differences within the scope will be construed as being included in the present disclosure.

The invention claimed is:

1. An apparatus for welding electrode tabs protruding from an electrode assembly to each other, the apparatus comprising:
a guide part configured to gather the electrode tabs on a predetermined gathering area;
a welding part configured to weld the electrode tabs gathered by the guide part; and
a bending part configured to bend the electrode assembly so that a length from the electrode assembly to the gathering area increases in at least a portion of the electrode tabs before being welded by the welding part.

2. The apparatus of claim 1, wherein the guide part is configured to gather the electrode tabs on the gathering area disposed below a reference plane passing through a center of the electrode assembly in a vertical direction, the reference plane being parallel to the ground when electrodes and separators of the electrode assembly are stacked in the vertical direction perpendicular to the ground, and
the bending part is configured to bend an edge of the electrode assembly, to which the electrode tabs are connected, upward.

3. The apparatus of claim 1, wherein the bending part includes a support block configured to support one of either bottom and top surfaces of the electrode assembly and a pressing block configured to press the other of the bottom and top surfaces of the electrode assembly toward the one of the bottom and top surfaces supported by the support block, when electrodes and separators of the electrode assembly are stacked in a vertical direction perpendicular to the ground.

4. The apparatus of claim 3, wherein a point at which the support block supports the one of either the bottom and top surfaces is disposed closer to an outside of the electrode assembly than a point at which the pressing block presses the other of the bottom and top surfaces of the electrode assembly.

5. The apparatus of claim 3, wherein the support block is configured to support an edge of the electrode assembly, to which the electrode tabs are connected, from below the electrode assembly, and
the pressing block is configured to press the edge, which is supported by the support block, downward from above the electrode assembly so as to perform bending.

6. The apparatus of claim 5, wherein the support block includes an inclined surface gradually increasing in height toward an outside of the electrode assembly as a surface disposed below the edge.

7. The apparatus of claim 1, further comprising a seating part on which the electrode assembly is configured to be seated,
wherein when electrodes and separators of the electrode assembly are stacked in a vertical direction perpendicular to the ground, the bending part includes a pressing block disposed inside the seating part in the vertical direction to move towards a top surface of the seating part, on which a bottom surface of the electrode assembly is seated, so as to press an edge of the electrode assembly, to which the electrode tabs are connected, from below.

8. The apparatus of claim 7, wherein the bending part further includes a support block configured to partially support a top surface of the electrode assembly while being pressed by the pressing block.

9. The apparatus of claim 1, wherein the bending part includes a support block configured to support an edge of the electrode assembly, to which the electrode tabs are connected, from below, when electrodes and separators of the electrode assembly are stacked in a vertical direction perpendicular to the ground.

10. An apparatus for welding electrode tabs protruding from an electrode assembly to each other, the apparatus comprising:
a guide part configured to gather the electrode tabs on a predetermined gathering area;
a welding part configured to weld the electrode tabs gathered by the guide part; and
a moving part configured to move the electrode assembly with respect to the guide part, in a direction along a stacking direction of electrodes and separators of the electrode assembly, such that a length from the electrode assembly to the gathering area increases in at least a portion of the electrode tabs before being welded by the welding part.

* * * * *